(12) United States Patent
Even

(10) Patent No.: US 6,412,215 B1
(45) Date of Patent: Jul. 2, 2002

(54) FISHING TROLLING DEVICE WITH QUICK ATTACHMENT ARRANGEMENT

(76) Inventor: Randy P. Even, 4226 S. 13th St., Sheboygan, WI (US) 53081

( * ) Notice: Subject to any disclaimer, the term of this patent is extended or adjusted under 35 U.S.C. 154(b) by 10 days.

(21) Appl. No.: 09/606,626

(22) Filed: Jun. 29, 2000

(51) Int. Cl.$^7$ .............................................. A01K 91/08
(52) U.S. Cl. ..................................................... 43/43.13
(58) Field of Search ............................ 43/43.13, 42.04, 43/42.49

(56) References Cited

U.S. PATENT DOCUMENTS

| | | | | |
|---|---|---|---|---|
| 4,524,538 A | * | 6/1985 | Halvorsen | 43/43.13 |
| 4,567,687 A | | 2/1986 | Even et al. | |
| 5,339,561 A | * | 8/1994 | Weber | 43/43.13 |
| 5,355,615 A | * | 10/1994 | Spickelmire | 43/43.13 |
| 5,548,919 A | * | 8/1996 | Hicks | 43/43.13 |
| 5,875,583 A | * | 3/1999 | Church | 43/43.13 |
| 6,016,622 A | | 1/2000 | Even | |
| 6,119,389 A | * | 9/2000 | Walker | 43/43.13 |

* cited by examiner

Primary Examiner—Kurt Rowan
(74) Attorney, Agent, or Firm—Andrus, Sceales, Starke & Sawall, LLP

(57) ABSTRACT

A fishing trolling device includes a trolling plane having a mounting surface and guide means on the trolling plane for guiding a fishing line along the trolling plane through the guide means. One end of the line extends to a baiting lure and the other end of the line is reelable for trolling. A releasable latch means includes a latch arm engageable with a pair of gripper jaws on the trolling plane and has a latched condition clamping the trolling plane to the line. The latch means also has a released condition responsive to the strike of a fish on the lure unclamping the trolling plane from the line and providing free sliding passage of the line through the guide means along the trolling plane. The line through the guide means extends substantially parallel to the trolling plane in the released condition of the latch means. The latch means includes an eyelet guiding the other end of the line therethrough and then forwardly to the guide means. The fishing trolling device includes a quick attachment arrangement enabling attachment of the fishing line to the trolling device without cutting the fishing line.

9 Claims, 5 Drawing Sheets

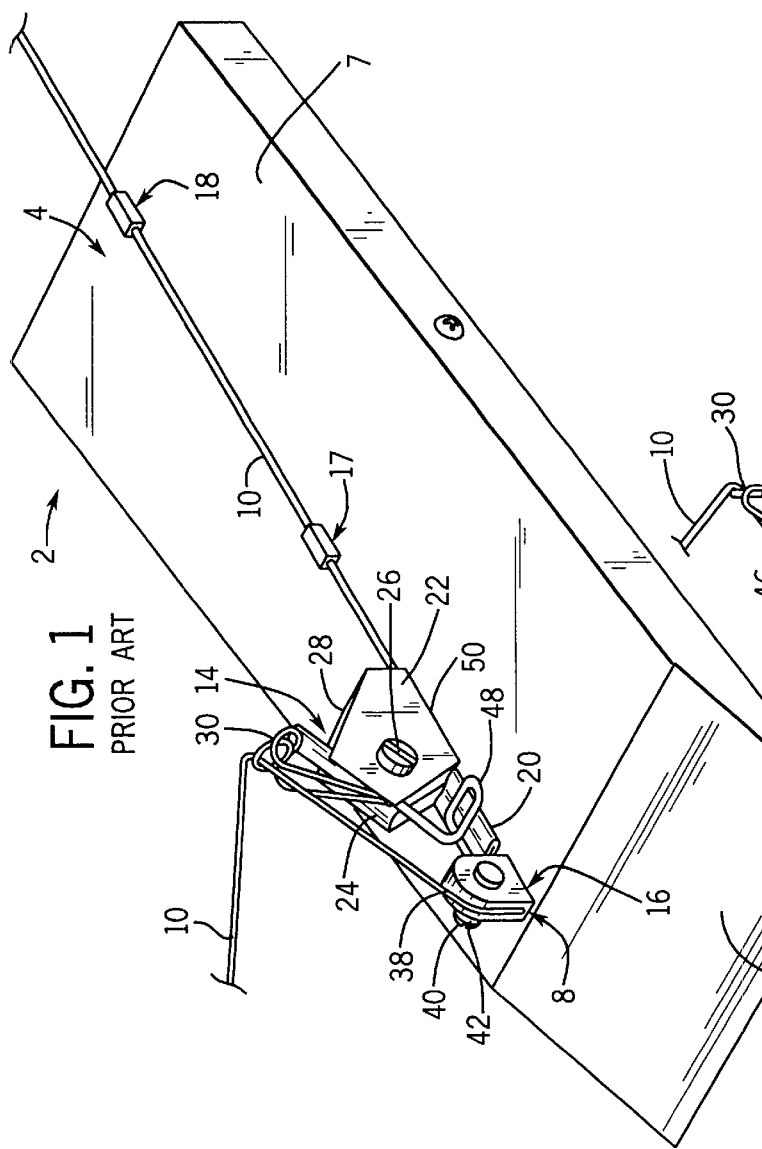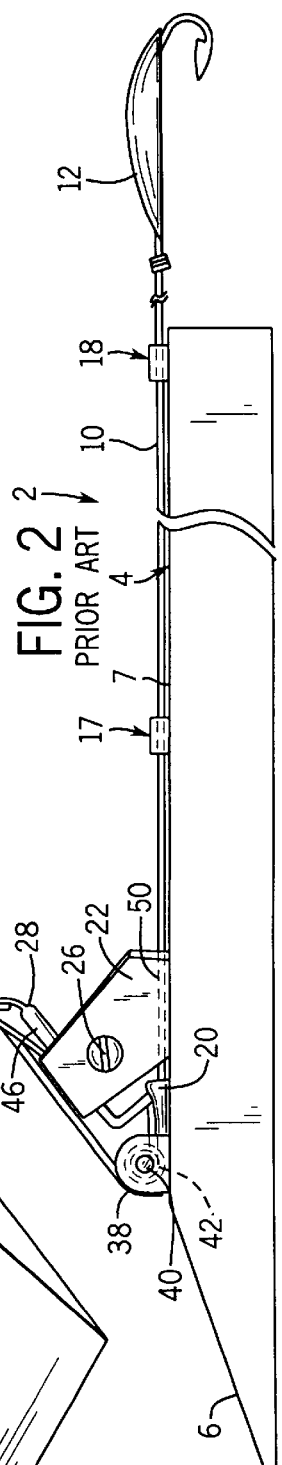

FISHING TROLLING DEVICE WITH QUICK ATTACHMENT ARRANGEMENT

FIELD OF THE INVENTION

The invention relates to a fishing trolling device for carrying bait or a lure alongside a boat when trolling.

BACKGROUND OF THE INVENTION

The invention provides a trolling device which is clamped to a fishing line extending therethrough. In the latched condition, the trolling device is locked onto the line. In the unlatched condition, the trolling device may freely slide along the line. When the fish bites, the latch trips, and the line slides freely through the trolling device, where the fish need not pull the trolling device along with it, which otherwise may result in increased line breakage.

The line length between the trolling device and the fish is adjustable, which may be desirable for different locales or certain types of fish. Regardless of the line length between the trolling device and the fish, when the fish bites and the latch is released, the fish is directly reeled in and netted because the trolling line extends through the trolling device and is also the baiting line. In contrast, if a first trolling line is tied to the front of the trolling device and a second separate baiting line is tied to the rear of the trolling device, the length of the baiting line cannot be greater than the length of the fishing pole, otherwise the fish cannot be netted when reeled all the way in. This maximum limit on the length of the bait line may be undesirable.

The present invention relates to an improvement in U.S. Pat. No. 4,567,687, issued Feb. 4, 1986, the disclosure of which is hereby incorporated by reference. In that patent, the fishing line extends contiguously along the planar surface of a diving plane. In the released condition, the diving plane slides freely along the line in the trolling direction, minimizing drag and line breakage. The diving plane has an upstanding fin extending rearwardly, with the fishing line being guided rearwardly to the base of the fin along the diving plane. Releasable latch means on the diving plane has a latched condition clamping the diving plane to the line, and a released position responsive to the strike of a fish unclamping the diving plane from the line and enabling the diving plane to slide along the line in the trolling direction with the line sliding freely through the base of the fin. The line extends rectilinearly along the top planar surface of the diving plane between front and rear guide members in each of the latch and released conditions.

The invention set forth in the '687 patent further provides extended line life because the line is not being pulled away from friction grip jaws or the like in a ripping or frictionally releasing type manner. Instead, a latch arm, for example made of steel or the like, is subjected to frictional clamping and unclamping wear and tear with frictional jaws therein to substantially diminish the line breakage by saving the line from undergoing such stress.

A further improvement to the '687 patent is set forth in U.S. Pat. No. 6,016,622, issued Jan. 25, 2000, the disclosure of which is also herein incorporated by reference. Recognizing that the point of contact between the fishing line and the eyelet on the distal end of the latch arm is liable to cause line breakage, the diver is provided with a protective sleeve in the form of a coil spring. The spring encircles the line such that an inside surface of the spring defines an increased surface area for the line in the vicinity of the eyelet, so as to minimize line breakage.

While the '687 and '622 patents generally provide an effective fishing trolling device, it is noted that in order to use these devices the fishing line must be cut and then threaded through the guide members on the mounting surfaces of the devices. Once the trolling devices have been tied to the fishing lines, the fishing poles must be stored with the devices dangling therefrom. Because of the relative size of the trolling devices, their dangling attachment can cause problems in the handling and storage of the fishing poles. Accordingly, it is desirable to provide an improved fishing trolling device which can be quickly attached and detached from the fishing line without cutting or damaging the line.

SUMMARY OF THE INVENTION

It is one object of the present invention to provide a fishing trolling device in the form of a ski or planer which will carry a bait line alongside the boat while trolling.

It is also an object of the present invention to provide a fishing trolling device which can be easily manipulated to couple the device to a medial portion of a fishing line without destroying the integrity of the line.

It is an additional object of the present invention to provide a fishing trolling device having a latch arrangement which will permit the device to slide freely along the line when a fish strikes the line.

It is a further object of the present invention to provide a fishing trolling device which can easily be detached from a fishing line so as to improve handling and storage of fishing poles.

In one aspect of the invention, a fishing trolling device comprises a trolling planer having a mounting surface and guide means on the trolling plane for guiding a fishing line along the trolling plane through the guide means. One end of the line extends to a baiting lure and the other end of the line is reelable for trolling. Releasable latch means includes a latch arm engageable with a pair of gripper jaws on the trolling plane having a latched condition clamping the trolling plane to the line. The latch means also has a released condition responsive to the strike of a fish on the lure unclamping the trolling plane from the line and providing free sliding passage of the line through the guide means along the trolling plane. The line through the guide means extends substantially parallel to the trolling plane in the released condition of the latch means. The latch means includes an eyelet guiding the other end of the line therethrough and then forwardly to the guide means. The invention is improved wherein the guide means form a quick attachment arrangement enabling attaching of the fishing line to the trolling device without cutting the fishing line. The quick attachment arrangement includes a first guide member secured to the mounting surface in front of the latch means, and a second guide member secured to the mounting surface behind the latch means, both guide members taking the form of a double coil having a free end. The quick attachment arrangement also includes the eyelet being formed with a double coil The quick attachment arrangement further includes a cutaway portion at the base of one of the gripper jaws allowing fishing line to be introduced through the cutaway and retained between the jaws. The trolling device has a rectangular profile with a ramped rudder surface including an adjustable, extendable portion. The trolling device is preferably a trolling ski or planer. The latch means includes a line clamping position surrounded by a soft, flexible element engageable with the line when the latch means is in the latched position. The latch means includes an upstanding tab on the forward end of the mounting surface pivotally mounting the latch arm, the tab being disposed in offsetting relationship relative to the jaws.

In another aspect of the invention, a fishing trolling ski comprises a trolling plane having a flat mounting surface and a ramped rudder surface, and guide means on the trolling plane for guiding a fishing line. One end of the line extends to a baiting lure and the other end of the line is reelable for trolling of the line. A releasable latch member on the trolling plane has a latched condition frictionally engaged with latching means on the trolling plane at a first portion of the latch member and clamping the trolling plane to the line at a second portion of the latch member, such that upon trolling, the trolling device runs alongside a boat. The latch member has a released condition responsive to the strike of a fish on the lure unclamping the first portion of the latch member from the latching means to unclamp the trolling plane from the line at said second portion of said latch member and providing free sliding passage of the line through the guide means. A strike of a fish causes frictional unclamping of the first portion of the latch member, such that the first portion of the latch member suffers frictional clamping and unclamping wear and tear. The improvement resides in the guide means including a pair of spiral members at the front end and rear end of the flat mounting surface constructed and arranged to allow introduction and retention of an uncut portion of fishing line.

In yet another aspect of the invention, a fishing trolling device comprises a trolling plane having a forward end and a rearward end. A spiral guide means is provided on the forward end and the rearward end of the trolling plane for guiding a fishing line, one end of the line extending to a baiting lure, and the other end of the line being reelable for trolling. A releasable latch means on the trolling plane has a latched condition clamping the trolling plane to the line, such that upon trolling, the trolling device runs alongside the boat. The latch means has a released condition responsive to the strike of a fish on the lure unclamping the trolling plane to slide along the line in a trolling direction. The latch means includes a pivoted latch arm engageable with a pair of gripperjaws, a front upstanding tab on the forward end of the trolling plane pivotally mounting the latch arm. The latch arm has a double looped eyelet at the end thereof opposite the front tab and the line extends through the eyelet, the spiral guide means and the forward end of the trolling plane. With this construction, the uncut portion of the fishing line is manipulable in the spiral guide means on the rearward end of the trolling plane through the cutaway portion of one of the gripperjaws, the spiral guide means on the forward end of the trolling plane and the double looped eyelet, such that the line is attached to the trolling device without cutting of the line.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a top perspective view of a prior art fishing trolling device;

FIG. 2 is a side elevational view of FIG. 1;

DETAILED DESCRIPTION OF THE INVENTION

Figure 3:
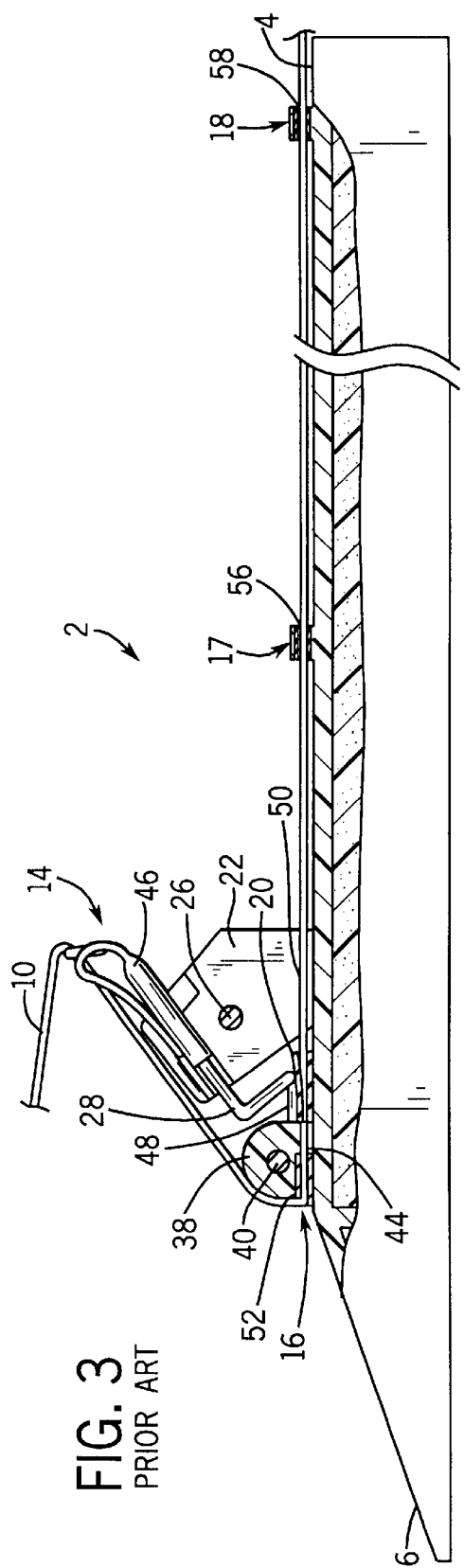
FIG. 3 is a cross sectional view of the prior art trolling devices of FIGS. 1 and 2 in a latched condition.

FIG. 1 shows a prior art trolling device 2 in accordance with the aforementioned U.S. Pat. No. 4,567,687 comprising a trolling plane 4 which has a ramped rudder surface 6 and a planar mounting surface 7. Such a device is known as a trolling ski or planer which typically measures 9½ inches in length by 3½ inches in width by ¾inches thickness and weighs about 9.5 ounces. Guide means 8 on the trolling plane 4 guides the fishing line 10 along plane 4. One end of the line 10, for example the right end, extends to a baiting lure or the like 12 (FIG. 2), and the other end of the line 10, for example, the left end of line 10 is reelable, such as from a fishing pole for trolling, or the like. Releasable latch means 14 on trolling plane 4 has a latched condition shown in FIGS. 1–3, clamping plane 4 to line 10, such that upon trolling the trolling device runs alongside a boat with its ramped rudder and mounting surfaces 6 and 7, respectively, facing inwardly towards the boat. The bottom of trolling device 2 is typically provided with a pivotable, flexible flag 13 (not shown) which indicates the relative position of the trolling device in the water. The latch means 14 has a released condition, as shown in FIG. 4, responsive to the strike of a fish on lure 12 unclamping trolling plane 4 from the line and enabling free sliding passage of line 10 through guide means 8 along the trolling plane 4. Line 10 extends contiguously along the planar surface of trolling plane 4 in both the latched and released conditions of latch means 14.

Guide means 8 includes respective front, middle and rear guide members 16, 17 and 18 located in front, in the middle and in the rear, respectively, on the planar mounting surface of plane 4. Line 10 extends through and rectilinearly between front and rear guide members 16 and 18 in each of the latched and released conditions of latch means 14. Latch means 14 includes gripper means 20 for gripping line 10 between front and rear guide members 16 and 18 to clamp plane 4 to line 10. In one form, gripper means 20 is a resiliently, collapsible tubular member, for example, soft rubber. Line 10 extends through the tubular member 20 and is gripped by and clamped between opposing inner surfaces of tubular member 20 in the latched condition.

Latch means 14 includes friction grip jaw means located on the front end of the mounting surface 7 behind guide member 16 and provided by a pair of upstanding jaws 22 and 24 spaced by a gap adjusted by screw 26. Trolling plane 4 and upstanding jaws 22 and 24 are typically made of plastic and integrally molded. A pivoted latch arm 28 has a latched position frictionally engaged between and held by jaws 22 and 24 and including an eyelet 30 guiding line 10 therethrough then forwardly (FIGS. 1–3) to front guide member 16 through the jaws 22,24 and guide members 17,18. Latch arm 28 in the latched position (FIGS. 1–3) coacts with line gripper means 20 to clamp trolling plane 4 to line 10. The latch arm 28 is frictionally released from jaws 22 and 24 upon the strike of the fish on lure 12. Turning of screw 26 clockwise (FIG. 1) will increase the frictional gripping of latch arm 28 by jaws 22 and 24 which, in turn, requires a larger fish before jaws 22 and 24 release latch arm 28 to a released, unlatched condition. The latch arm 28 in the released position unclamps gripper means 20 and line 10. In the released position of latch arm 28 (FIG. 4), line 10 extends rectilinearly rearwardly through eyelet 30 and the front, middle and rear guide members 16, 17 and 18.

Fishing line 10 is guided rearwardly through guide members 16, 17 and 18 along the top planar surface of trolling plane 4. In the released condition, trolling plane 4 may slide along line 10 in the trolling direction with line 10 sliding freely through the guide members 16, 17 and 18.

A front upstanding tab 38 on the trolling plane 4, for example of integrally molded plastic, is forward of jaws 22 and 24 and pivotally supports latch arm 28, as screw 40 extends through a looped portion 42 at the pivoted end of latch arm 28 and through tab 38. Tab 38 also guides line 10 rearwardly therethrough along passage 44 drilled, or otherwise formed longitudinally forward-rearward through the base of tab 38 along the top planar surface of trolling plane 4. Latch arm 28 has eyelet 30 at the end thereof opposite front tab 38. In the latched position, latch arm 28 is pivoted from tab 38 rearwardly, and frictionally engaged and held by jaws 22 and 24 along a central portion 46 between the eyelet end at 30 and the pivotally mounted end 42. Arm 28 includes a line clamping portion 48 coacting in the latched position with line gripper means 20 between the base 50 of jaws 22 and 24 and the front tab 38 to clamp trolling plane 4 to line 10. Upon release, arm 28 pivots forwardly to the released position (FIG. 4) unclamping gripper means 20 and line 10, the line extending freely through eyelet 30 on arm 28, then rearwardly through tab 38 and front guide member 16 and through middle guide member 17, jaws 22 and 24, and rear guide member 18.

In the latched, clamped position, the top outer surface of tubular member 20 is engaged by line clamping portion 48 of arm 28 to collapse tubular member 20 and press the bottom, outer surface of tubular member 20 against the top of trolling plane 4. This, in turn, causes the opposing inner surfaces of tubular member 20 to clamp and grip line 10 therebetween. Line 10 is thus gripped and clamped between the inner surfaces of the soft, rubber tubular member 20 rather than being gripped between jaw members or the like, such as 22 and 24. This provides extended line life because the line is not pulled away from jaw type members in a ripping or frictionally releasing type manner. Instead, central portion 46 of latch arm 28 is gripped between jaws 22 and 24. Arm 28 is made of steel, or the like, and thus not subject to damage or breakage from the frictional engagement with and release from jaws 22 and 24. In alternate species, tube 20 is eliminated, and line clamping portion 48 of arm 28 is the line gripper means or is provided with a rubber or the like component wrapped there around to grip line 10 and frictionally clamp it against the top of trolling plane 4. Likewise, in these species, line breakage is significantly reduced because the clamping function does not require that the line be ripped or pulled away from frictional jaws or the like upon the strike of the fish. Instead, latch arm 28 and portion 46 is subject to such frictional unclamping wear, thus saving the line from undergoing such stress. This substitution of latch arm portion 46 for line 10 in being subjected to the frictional clamping and unclamping wear and tear substantially diminishes line breakage.

Figure 4:
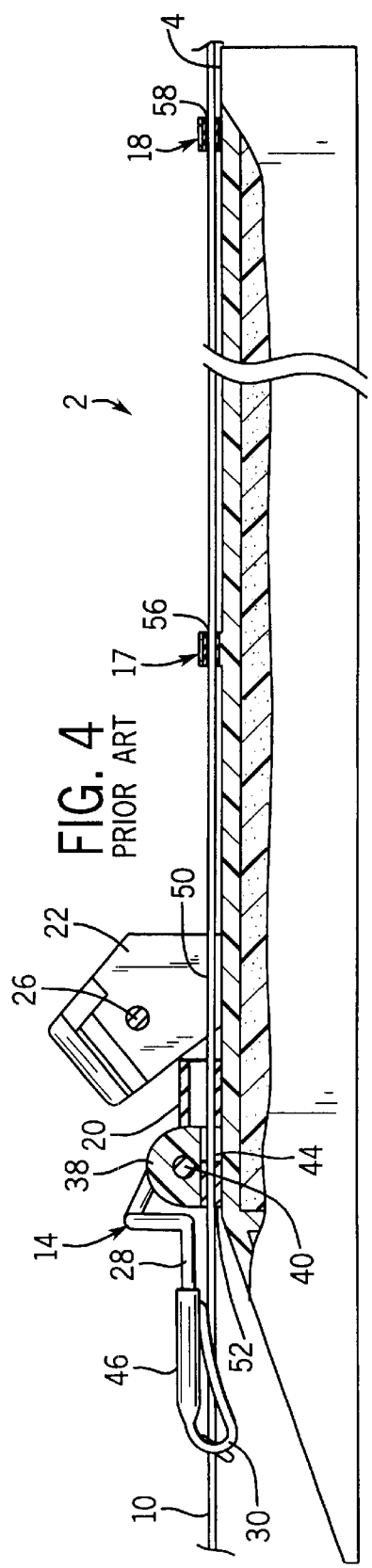
FIG. 4 is a view like FIG. 3, but showing a released condition of the prior art trolling device.

As seen in FIGS. 3 and 4, guide means 16 in the form of a front bushing 52 with a rounded front, outer edge is provided in the front of tab 38 at the base thereof along a top planar surface of trolling plane 4 for guiding line 10 therethrough. Guide means 17 in the form of a middle bushing 56 with a rounded rear, outer edge is provided medially along the top planar surface of trolling plane 4 for guiding the line 10 therethrough. Guide means 18 in the form of a rear bushing 58 is provided rearwardly along the top planar surface of trolling plane 4 for guiding the line 10 therethrough. This has been found to further reduce line breakage.

Figure 5:
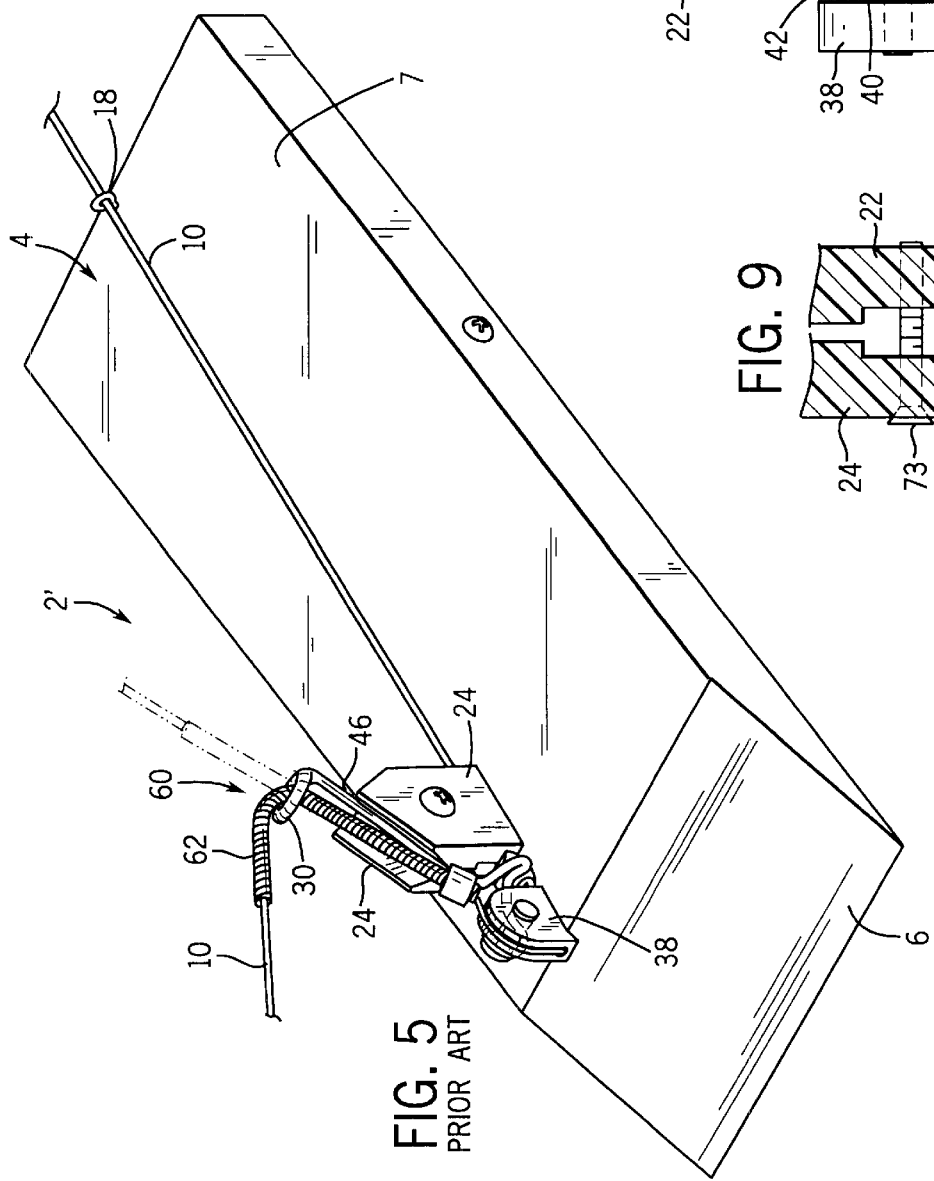
FIG. 5 is a perspective view of an alternative embodiment of a prior art fishing trolling device in a latched condition in which the fishing line is provided with a protective spring sleeve.

FIG. 5 illustrates a first alternative embodiment of fishing trolling device 2' which is similar in general structure and function to the fishing trolling device 2 described above, except for a shielding arrangement 60 for protecting the line 10 as it passes through eyelet 30. In particular, arrangement 60 is embodied preferably in the form of an elongated, deformable coil spring 62 encircling the line 10 as the line extends upwardly and rearwardly of front tab 38, alongside central portion 46 of latch arm 28, through and against an inner, upper portion of eyelet 30 and then beyond eyelet 30 forwardly and upwardly for a predetermined distance. Spring 62 is retained on the lowermost end of latch arm central portion 46 by a resiliently collapsible tubular member 64 which tightly surrounds spring 62 in central portion 46. In the latched condition shown in FIG. 5, spring sleeve 62 assumes a curved formation around eyelet 30, and line 10 is engaged with an inner surface of sleeve 62. In the released condition, spring sleeve 62 assumes a straight formation, such that a longitudinal axis of sleeve 62 is substantially parallel to the top surface of the trolling plane 4 and the line 10 is disengaged from sleeve 62. It should be understood that the inside surface of spring sleeve 62 defines an increased surface area for the line 10 in the vicinity of eyelet 30, so that line breakage is further minimized.

While the afore described trolling devices 2 and 2' have generally performed in a satisfactory manner, it should be understood that their installation necessitates the cutting and damaging of the fishing line 10. That is, one end of the fishing line 10 must be threaded through the guide members 16, 17 and 18 and between the jaws 22 and 24 and then tied to the bait line. Once the lines are pulled from the water, the fishing poles must be stored with the trolling devices 2 and 2' connected thereto. Given the relative size of the devices 2 and 2', this creates problems in the handling of several fishing poles.

Figure 8:
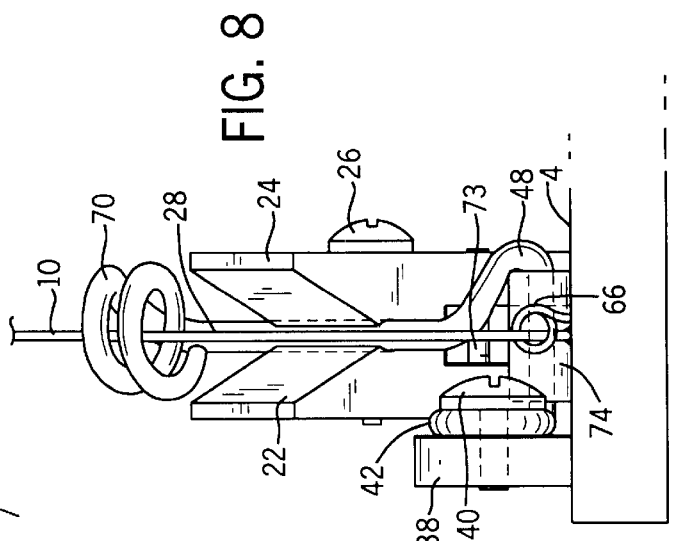
FIG. 8 is an enlarged, partial, front view of the trolling device shown in FIG. 6.
Figure 6:
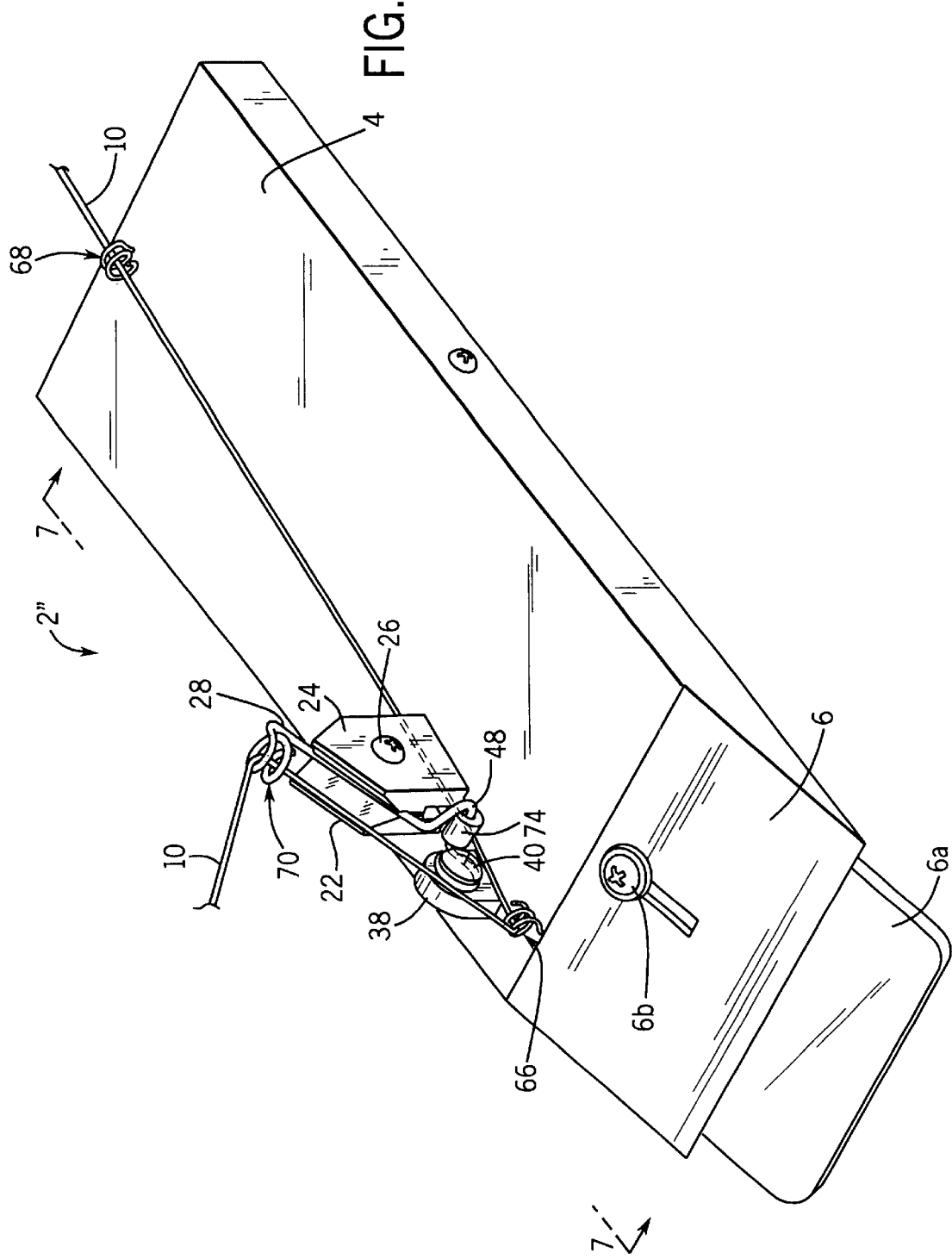
FIG. 6 is a top perspective view of a trolling device embodying the present invention.
Figure 7:
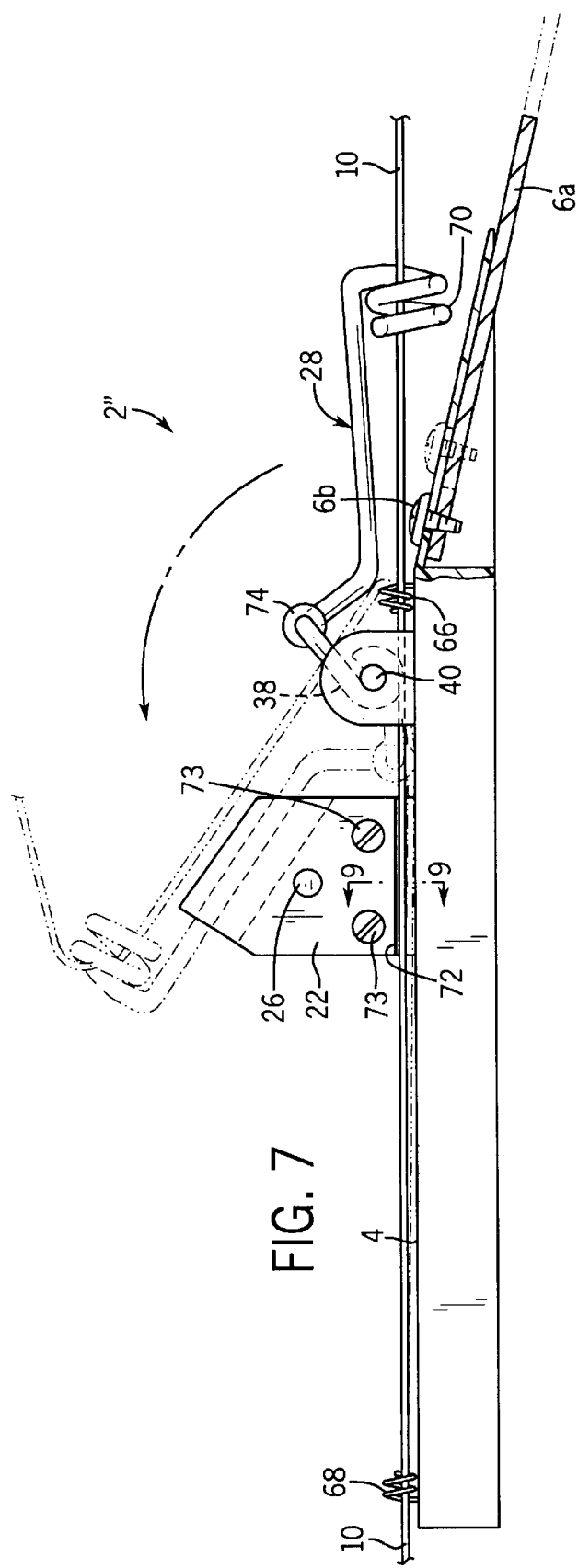
FIG. 7 is an elevational view taken on line 7—7 of FIG. 6.

In order to rectify these problems, the trolling device 2" shown in FIGS. 6–8 is provided with a quick attachment arrangement which enables the trolling devices to be connected to the fishing line 10 without cutting and damaging the line. Such arrangement also enables the fishing poles to be stored without the trolling devices dangling therefrom.

Trolling device 2" is substantially similar in general structure and function to the devices 2 and 2' described above, except for the following structural differences. Instead of guide members 16, 17 and 18, trailing device 2' includes a front guide member 66 and a rear guide member 68, both of which take the form of an open double coil or spiral element having an end which will permit the introduction and retention of a medial, uncut portion of the fishing line 10 between the fishing pole and the bait. As seen in FIG. 8, upstanding tab 38 is placed in an offsetting relationship to the jaws 22 and 24 and serves solely to pivotally mount latch arm 28 thereto. Latch arm 28 now includes an eyelet 70 which is in the form of a double coil or spiral having an end which will also permit the introduction and retention of a medial, uncut portion of fishing line 10 between the rod and the bait. The base of jaw member 24 is cut away at 72 (FIG. 9) to further permit the introduction and retention of the uncut, medial portion of fishing line 10. The jaws 22 and 24 are further held together by a pair of lower screws 73. As will be described hereafter, in the latched condition (shown in phantom in FIG. 7), the coil eyelet 70 guides the medial portion of fishing line 10 to the front coil guide member 66 through the jaws 22 and 24 and rear coil guide member 68. In this design, the clamping portion 48 of latch arm 28 is provided with a rubber or like component 74 wrapped there around to grip line 10 and frictionally grip it against the top of trolling plane 4 at a location between the front coil guide member 66 and the jaws 22,24. The ramped rudder surface 6 may include an extendable portion 6a, the length of which is made adjustable by tightening and loosening a screw 6b.

Figure 9:
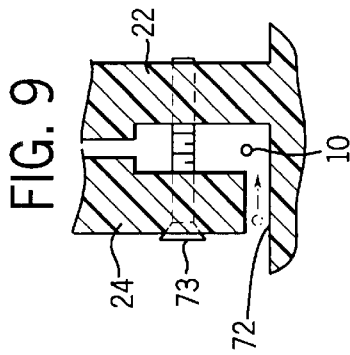
FIG. 9 is a cross sectional view taken on line 9—9 of FIG. 7.

When it is desired to attach the trolling device 2" to the fishing line 10, one preferably manipulates an uncut, medial portion of the line 10 in the rear coil guide member 68 so that it will pass therethrough. That is, using FIG. 7, the medial portion of the line 10 held between one's fingers is positioned beneath the coils with the line in one's right hand being introduced between the coils and wound around the remainder of the coil. The line 10 is then placed between the jaws 22 and 24 using the cut away portion 72 to slip the line thereunder (FIG. 9). Next, the uncut, medial portion of the line 10 is manipulated in the front coil guide member 66 so that it will pass therethrough. This time, the uncut line 10 is placed beneath the coils with the line in one's left hand being introduced between the coils and wound around the remainder of the coil within. Finally, the line 10 is manipulated in the double coil eyelet 70 of the latch arm 28 in the same manner as attaching the line to rear coil guide member 68. It should therefore be appreciated that double coil eyelet 70, front coil guide member 66, the cutaway 72 in jaw 24 and the rear coil guide member 68 collectively define the quick attachment arrangement.- In the latched condition, the fishing line 10 is clamped to the trolling plane 4, such that the trolling device 2" remains stationary relative to the line 10. In the released condition, responsive to the strike of a fish on the line, line 10 is unclamped and slides freely along the trolling plane 4.

When fishing is done, the line is pulled and the device 2" is easily detached from the line 10 by reversing the installation procedure and unwinding the fishing line 10 from the coil guide member 66 and 68, and the eyelet 70 and extracting the line from between the jaws 22 and 24 using cutaway 72.

Various alternatives and embodiments are contemplated as being within the scope of the following claims particularly pointing out and distinctly claiming the subject matter regarded as the invention.

I claim:

1. In a fishing trolling device comprising a trolling plane having a mounting surface, guide means on the trolling plane for guiding a fishing line along the plane of the trolling plane through said guide means, one end of the line extending to a baiting lure and the other end of the line being reelable for trolling, and a releasable latch means including a latch arm engageable with a pair of gripper jaws on said trolling plane having a latched condition clamping said trolling plane to the line, said latch means having a released condition responsive to the strike of a fish on the lure unclamping said trolling plane from the line and providing free sliding passage of the line through said guide means along the trolling plane, the line through said guide means extending substantially parallel to the plane of the trolling plane in said released condition of said latch means, said latch means including an eyelet guiding said other end of the line therethrough and then forwardly to said guide means, the improvement wherein:

the guide means form a quick attachment arrangement enabling attachment of the fishing line to said trolling device without cutting the fishing line, and wherein the quick attachment arrangement includes a cutaway portion at the base of one of the gripper jaws allowing fishing line to be introduced through the cutaway and retained between the jaws.

2. The improvement of claim 1, wherein the quick attachment arrangement includes a first guide member secured to the mounting surface in front of the latch means and a second guide member secured to the mounting surface behind the latch means, the guide members taking the form of a double coil having a free end.

3. The improvement of claim 2, wherein the quick attachment arrangement includes the eyelet being formed with a double coil.

4. The improvement of claim 1, wherein the trolling device has a rectangular profile with a ramped rudder surface.

5. The improvement of claim 1, wherein the latch means includes a line clamping position surrounded by a soft flexible element engageable with the line when the latch means is in the latched position.

6. The improvement of claim 1, wherein the latch means includes an upstanding tab on the forward end of the mounting surface pivotally mounting said latch arm, said tab disposed in offsetting relationship relative to the jaws.

7. The improvement of claim 4, wherein the ramped rudder surface includes an adjustable, extendable portion.

8. The improvement of claim 1, wherein the trolling device is a trolling ski or planer.

9. A fishing trolling device comprising:

a trolling plane having a forward end and a rearward end;

spiral guide means on said forward end and said rearward end of said trolling plane for guiding a fishing line, one end of the line extending to a baiting lure and the other end of the line being reelable for trolling;

releasable latch means on said trolling plane having a latched condition clamping said trolling plane to the line such that upon trolling, said trolling device runs alongside a boat, said latch means having a released condition responsive to the strike of a fish on the lure unclamping said trolling plane to slide along the line in a trolling direction, said latch means including a pivoted latch arm engageable with a pair of gripper jaws, a front upstanding tab on said forward end of said trolling plane pivotally mounting said latch arm, said latch arm having a double looped eyelet at the end thereof opposite said front tab, the line extending through said eyelet and spiral guide means on the forward end of the trolling plane and one of, the gripper jaws having a cutaway portion allowing fishing line to be introduced through the cutaway portion and retained between the jaws, whereby;

an uncut portion of fishing line is manipulable in said spiral guide means on said rearward end of the trolling plane, through said cutaway portion of one of the gripper jaws, said spiral guide means on said forward end of the trolling plane and said double looped eyelet such that the line is attached to the trolling device without cutting of the line.

* * * * *